United States Patent [19]
Karl et al.

[11] Patent Number: 5,127,849
[45] Date of Patent: Jul. 7, 1992

[54] ENVIRONMENTALLY SEALED BATTERY CONNECTOR

[75] Inventors: David H. Karl, Tamarac; James V. Lauder, Ft. Lauderdale; Vito Dionisio, Jr., Sunrise, all of Fla.

[73] Assignee: Motorola, Inc., Schaumburg, Ill.

[21] Appl. No.: 706,424

[22] Filed: May 28, 1991

[51] Int. Cl.⁵ .................................. H01R 3/00
[52] U.S. Cl. .............................. 439/500; 429/181
[58] Field of Search .............. 439/500, 271-277; 429/180, 181

[56] References Cited

U.S. PATENT DOCUMENTS

| | | | |
|---|---|---|---|
| 983,760 | 2/1911 | Patterson | 439/500 X |
| 1,453,791 | 5/1923 | Gossling | 429/181 |
| 2,308,270 | 1/1943 | Cubert | 439/500 X |
| 4,213,078 | 7/1980 | Ferrell et al. | 439/500 X |

Primary Examiner—Neil Abrams
Assistant Examiner—Khiem Nguyen
Attorney, Agent, or Firm—Pedro P. Hernandez; Daniel K. Nichols

[57] ABSTRACT

An environmentally sealed battery connector (100) includes a battery contact member (102) having a battery contact location (108). Battery connector (100) also includes a resilient seal member (118) having a battery mating ridge (110) which compresses against battery (204) and environmentally seals the point of contact between battery (204) and battery contact location (108).

16 Claims, 1 Drawing Sheet

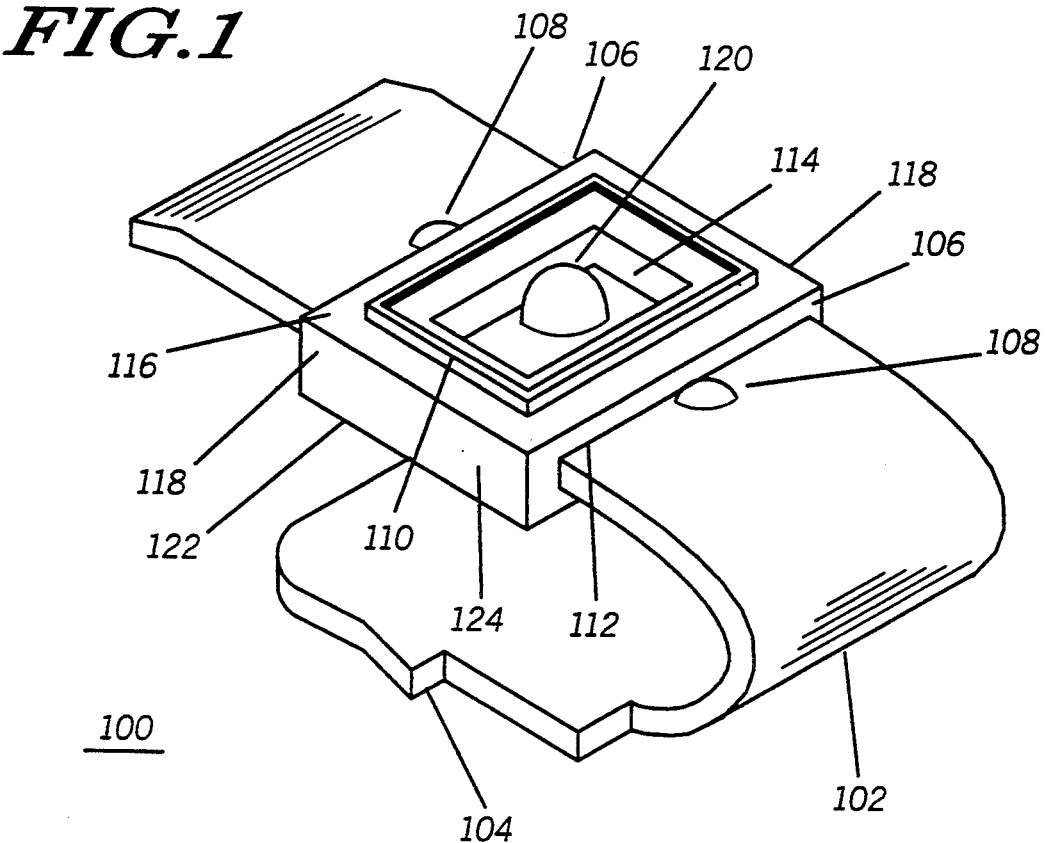
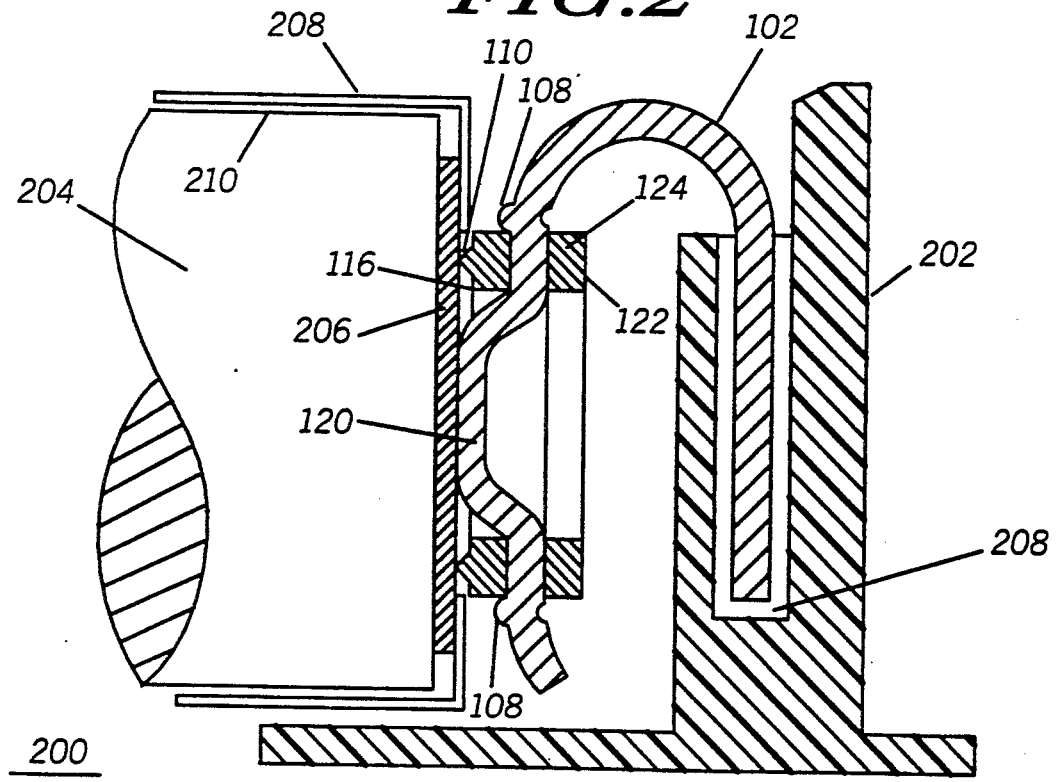

ENVIRONMENTALLY SEALED BATTERY CONNECTOR

FIELD OF THE INVENTION

This invention relates generally to battery connectors, and more specifically to environmentally sealed battery connectors.

BACKGROUND OF THE INVENTION

Electrical connections which rely on surface contact are subject to corrosion caused by airborne chemical reactions. Corrosion is especially common in the electrical connection between a battery terminal and the battery contact area, which is part of the battery connector that electrically connects to the battery terminal. Corrosion at the battery connection points can lead to the blockage of current flow through the connection, causing the battery operated device (i.e. battery operated radio) to stop operating. This corrosion problem is especially common in battery operated radios which operate near corrosive environments such as salt water, chemical processing facilities, etc.

A need exists for a environmentally sealed battery connector which can help reduce the oxidation caused by environmental factors on battery connections. The battery connector should be inexpensive and easy to manufacture in order to be able to take full advantage of the environmental protection in both new and existing product applications.

SUMMARY OF THE INVENTION

The environmentally sealed battery connector comprises a battery connector member having a battery contact area and a resilient seal member mounted on the battery connector. The resilient seal member has a battery mating surface substantially surrounding the battery contact area.

In another aspect of the present invention, the resilient seal member includes a compressible battery mating ridge which substantially surrounds the battery contact location and is located on the battery mating surface.

In still another aspect of the present invention, a radio housing assembly comprises a radio housing member having at least one battery connector cavity. The radio housing assembly including a battery connector member having a battery contact area and a resilient seal member mounted on the battery connector member. The resilient seal member having a battery mating surface substantially surrounding the battery mating area.

BRIEF DESCRIPTION OF THE DRAWINGS

FIG. 1 is a drawing of the environmentally sealed battery connector in accordance with the present invention.

FIG. 2 is a partial cross-sectional view of a radio housing assembly having an environmentally sealed battery connector coupled to a battery in accordance with the present invention.

DESCRIPTION OF A PREFERRED EMBODIMENT

In FIG. 1 an environmentally sealed battery connector 100 is shown, in accordance with the present invention. Battery connector 100 includes a battery contact area 120 which is preferably elevated. The battery contact area is formed by stamping the single sheet of metal which forms battery connector member 102. Battery connector member 102 is formed from a single piece of metal made from nickel-silver, nickle plated beryllium copper, nickel plated spring steel, or any other metal known in the art for use in such applications. Connector member 102 is preferably formed to give connector 100 a spring action that becomes mechanically loaded once a battery is coupled to connector 100. In the preferred embodiment, connector 100 also includes a retaining means such as locking feature 104 which is used to lock battery connector 102 into a housing cavity member (not shown). Locking feature 104 is pressed into a housing such as a plastic housing. Locking feature 104 helps connector 100 stake into the housing, thereby retaining connector 100 once it has been inserted into an appropriate housing.

Connector 100 further includes a resilient seal member 124 mounted on battery connector 102, which has a battery mating surface 116 and back surface 122. Seal member 124 also has first opposed side surfaces 118 and second opposed side surfaces 106. Seal member 124 is preferably insert molded using conventional molding techniques onto battery connector member 102 prior to connector member 102 being spring formed or stamped.

Seal member 124 is preferably formed from an elastomer such as silicon or urethane having a Shure A durometer of approximately 60. Rubber or other resilient materials can also be used for seal member 124. Seal member 124 also includes a compressible battery mating ridge 110 having a height of approximately 0.01 inch which substantially surrounds the battery contact location 120. Mating ridge 110 forms a collapsible rib which seals the area around the point of contact between the battery contact location and the battery which is coupled to connector 100. Seal member opening 114 is designed to allow battery contact area 120 to make contact with the battery (not shown) which will be connected to connector 100.

Although seal member 124 is preferably insert molded onto sheet metal piece 102, seal member 124 could be molded separately and then slid onto sheet metal piece 102 via slits on the second opposed side surfaces 106. Optional resilient seal retainer members 108 can be formed by stamping connector member 102 at each of the two sides (sides 106) of seal member 124. Retainer members 108 can offer more retention to seal member 124 helping seal member 124 from shifting along the length of battery connector 102.

FIG. 2 shows a partial cross-sectional view of a radio housing assembly 200 having an environmentally sealed battery connector 100, coupled to a battery 204, in accordance with the present invention. Battery connector 100 is placed inside of a cavity area 208 found in radio housing 202. Radio housing 202 can be a typical radio housing manufactured from a plastic such as MAKROBLEND UT-400 RESIN ™, manufactured by Mobay, Inc. Locking feature 104, which is found on battery connector 102, is pressed into cavity area 208 where locking feature 104 grabs against the side walls of housing 202 and thereby retains battery connector 102 in place.

Battery 204 can be any type of battery known in the art such as nickle cadmium, alkaline, etc. Battery 204 has wall 210 which is covered by a heat shrink tubing material 208. Battery terminal 206 which in the preferred embodiment is a 0.005 inch thick nickle disk spot welded onto battery wall 210. Terminal 206 presses against battery contact area 120 once battery 204 is inserted into place. Battery connector 102 becomes mechanically loaded once battery 204 is in place, thereby compressing compressible battery mating ridge 110 against the surface of battery terminal 206. Seal member 124 also compresses against connector member 102 at inside surface 112 along the perimeter of battery contact area 120, thereby creating a seal between seal member 124 and connector member 102.

The size of resilient seal member 124 is designed so that compressible battery mating ridge 110 fits inside of the area formed by battery terminal 206, this will depend on the size of the battery in question. For example assuming that battery terminal has a 0.7 inch radius, seal member 124 could have an outer length of 0.5 inch along second opposed surface 106 and an outer length of 0.4 inch along first opposed surface 118. While the compressible mating ridge could have a outer length along the second opposed surface of 0.4 inch and 0.3 inch along first opposed surface 118. Seal member opening 114 could have an opening of approximately 0.3 inch by 0.2 inch. All sizes of seal member 124 will (lengths, height of mating ridge 110, durometer used, etc.) depend on the application being design for. The size of battery 204 and the amount of compression it places on seal member 124 will have to be taken into account as well when designing the characteristics of seal 124.

Once mating ridge 110 is compressed against battery terminal 206, battery contact area 120 is protected against environmental conditions such as airborne particles which can cause corrosion to build up at the contact point. Although the preferred embodiment has been shown with a raised battery contact area 120, the battery contact area 120 could be flush and battery terminal 206, could have the raised or protruding portion.

As shown, the present invention is an inexpensive method of protecting battery contact points against corrosion. The present invention can accommodate both new designs by using an insert molded seal member 124 or by designing a "slip-on" seal member 124 which can be slipped on to an existing battery connector.

What is claimed is:

1. An environmentally sealed battery connector for mating with a battery having a battery terminal surface, comprising:
    a battery connector member having a battery contact area for contacting to the battery terminal surface; and
    a resilient seal member mounted onto the battery connector and having a battery mating surface substantially surrounding the battery contact area, the battery mating surface sealably contacting the battery terminal surface once the battery contact area is mated to the battery terminal surface.

2. The environmentally sealed battery connector of claim 1, wherein the resilient seal member wraps around the battery connector member and is insert molded onto the battery connector member.

3. The environmentally sealed battery connector of claim 1, wherein the battery connector member is a conductive formed cantilevered spring contact.

4. The environmentally sealed battery connector of claim 3, wherein the resilient seal member is made from an elastomer material.

5. The environmentally sealed battery connector of claim 3, wherein the resilient seal member is made from silicone.

6. The environmentally sealed battery connector of claim 3, wherein the battery connector member is made from a single piece of metal.

7. The environmentally sealed battery connector of claim 3, wherein the battery connector member includes at least one resilient seal member retainer.

8. A battery connector for environmentally sealing a battery having a battery terminal surface the battery connector comprising:
    a cantilevered spring formed battery connector member having a battery contact area for mating to the battery terminal surface the battery connector member is formed from a single piece of conductive material; and
    a resilient seal member mounted onto the cantilevered spring formed battery connector member and having a battery mating surface substantially surrounding the battery contact area the resilient seal member having a compressible battery mating ridge that substantially surrounds the battery mating area and is located on the battery mating surface of the resilient seal member the compressible battery mating ridge sealably contacts the battery terminal surface once the battery terminal is mated to the battery contact area the resilient seal member is formed from an elastomeric material which is wrapped around the cantilevered spring formed battery connector.

9. The environmentally sealed battery connector of claim 8, wherein the resilient seal member is insert molded onto the spring formed battery connector.

10. The environmentally sealed battery connector of claim 8, wherein the battery connector member further includes a retainer means for retaining the battery connector member to a housing member.

11. A radio housing assembly, comprising:
    a radio housing member having at least one battery connector cavity;
    a cantilevered spring formed battery connector member having a battery contact area for mating to a battery having a battery terminal surface; and
    a resilient seal member having a battery mating surface substantially surrounding the battery contact area, and the battery mating surface having a compressible battery mating ridge that substantially surrounds the battery contact area and is located on the battery mating surface the compressible battery mating ridge sealably contacts the battery terminal surface once the battery terminal mates to the battery contact area providing for an environmental seal around the battery contact area.

12. The radio housing assembly of claim 11, wherein the resilient seal member is made from an elastomer material and is insert molded onto the battery connector member.

13. The radio housing assembly of claim 12, wherein the battery connector member is made from a single piece of metal which is spring formed.

14. The radio housing assembly of claim 1, wherein the battery connector member further includes a retainer means which is inserted into the battery connector cavity and retains the battery connector member to the radio housing member.

15. The radio housing assembly of claim 11, wherein the cantilevered spring formed battery connector becomes mechanically loaded once the battery contact area mates with the battery terminal surface, causing the compressible battery mating ridge to compress against the battery terminal surface and seals the battery contact area.

16. A battery connector for environmentally sealing a battery having a battery terminal surface, the batter connector comprising:
- a cantilevered spring formed battery connector member having a battery contact area for mating to the battery terminal surface, the battery connector member is formed from a single piece of conductive material; and
- a resilient seal member mounted onto the cantilevered spring formed battery connector member, the resilient seal member substantially wrapping around the cantilevered spring formed battery connector and having a battery mating surface substantially surrounding the battery contact area, the resilient seal member having a compressible battery mating ridge that substantially surrounds the battery mating area and is located on the battery mating surface of the resilient seal member, the compressible battery mating ridge sealably contacts the battery terminal surface once the battery terminal is mated to the battery contact area and provides for an environmental seal around the battery contact area.

* * * * *